United States Patent
Steichen et al.

(10) Patent No.: US 9,821,588 B2
(45) Date of Patent: Nov. 21, 2017

(54) RECORDING MEDIA

(75) Inventors: Christine E. Steichen, San Diego, CA (US); Xulong Fu, San Diego, CA (US); Lokendra Pal, San Diego, CA (US); Julio Cesar Alonso, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 14/391,600

(22) PCT Filed: Apr. 13, 2012

(86) PCT No.: PCT/US2012/033594
§ 371 (c)(1),
(2), (4) Date: Oct. 9, 2014

(87) PCT Pub. No.: WO2013/154583
PCT Pub. Date: Oct. 17, 2013

(65) Prior Publication Data
US 2015/0072120 A1    Mar. 12, 2015

(51) Int. Cl.
*B41M 5/52* (2006.01)
*B05D 1/26* (2006.01)
(Continued)

(52) U.S. Cl.
CPC ........... *B41M 5/5227* (2013.01); *B05D 1/265* (2013.01); *B32B 27/06* (2013.01); *B32B 27/08* (2013.01);
(Continued)

(58) Field of Classification Search
CPC ... B41M 5/5227; B05D 1/265; B05D 2507/01
See application file for complete search history.

(56) References Cited

U.S. PATENT DOCUMENTS

| 4,339,507 | A |   | 7/1982  | Kurtz et al. |          |
|-----------|---|---|---------|--------------|----------|
| 4,705,746 | A | * | 11/1987 | Tamagawa     | G03C 1/85 |
|           |   |   |         |              | 430/536  |

(Continued)

FOREIGN PATENT DOCUMENTS

| CN | 1238472   | 12/1999 |
| CN | 101641221 | 2/2010  |

(Continued)

OTHER PUBLICATIONS

Chinese SIPO, Chinese Patent Application No. 201280072360.1, First Office Action dated Jul. 1, 2015, 9 pages.

(Continued)

*Primary Examiner* — Robert Harlan
(74) *Attorney, Agent, or Firm* — HP Inc. Patent Department

(57) ABSTRACT

The present disclosure provides recording media and related methods. A recording media for printing can comprise a base paper and a backside extruded polyethylene layer on a side of the base paper. The backside extruded polyethylene layer can include a filler and an organic reagent admixed in the extruded polyethylene layer, wherein the filler and organic reagent are present in the backside extruded polyethylene layer in an amount of 20% by weight to 50% by weight based on the total weight of the backside extruded polyethylene layer.

15 Claims, 2 Drawing Sheets

(51) Int. Cl.
| | |
|---|---|
| *B41M 5/41* | (2006.01) |
| *B41M 5/42* | (2006.01) |
| *B41M 5/50* | (2006.01) |
| *G03G 7/00* | (2006.01) |
| *G03C 1/79* | (2006.01) |
| *D21H 19/58* | (2006.01) |
| *B32B 27/10* | (2006.01) |
| *B32B 27/06* | (2006.01) |
| *B32B 27/08* | (2006.01) |
| *B32B 27/18* | (2006.01) |
| *B32B 27/20* | (2006.01) |
| *B32B 27/32* | (2006.01) |
| *B32B 29/00* | (2006.01) |
| *B41M 5/44* | (2006.01) |

(52) U.S. Cl.
CPC .............. *B32B 27/10* (2013.01); *B32B 27/18* (2013.01); *B32B 27/20* (2013.01); *B32B 27/32* (2013.01); *B32B 29/00* (2013.01); *B41M 5/41* (2013.01); *B41M 5/42* (2013.01); *B41M 5/506* (2013.01); *B41M 5/508* (2013.01); *D21H 19/58* (2013.01); *G03C 1/79* (2013.01); *G03G 7/002* (2013.01); *G03G 7/004* (2013.01); *G03G 7/0013* (2013.01); *G03G 7/0086* (2013.01); *B05D 2507/01* (2013.01); *B32B 2255/00* (2013.01); *B32B 2255/10* (2013.01); *B32B 2264/00* (2013.01); *B32B 2264/102* (2013.01); *B32B 2264/104* (2013.01); *B32B 2307/75* (2013.01); *B32B 2429/00* (2013.01); *B32B 2559/00* (2013.01); *B41M 5/426* (2013.01); *B41M 5/44* (2013.01); *B41M 2205/32* (2013.01); *B41M 2205/34* (2013.01); *Y10T 428/2495* (2015.01); *Y10T 428/31895* (2015.04)

(56) References Cited

U.S. PATENT DOCUMENTS

| | | |
|---|---|---|
| 5,466,519 A | 11/1995 | Shirakura et al. |
| 6,391,532 B1 | 5/2002 | Sunderrajan et al. |
| 6,641,973 B1 | 11/2003 | Dontula et al. |
| 2004/0224104 A1 | 11/2004 | de Vries et al. |
| 2005/0003113 A1 | 1/2005 | Chen et al. |
| 2008/0008882 A1 | 1/2008 | Chen |
| 2010/0003427 A1 | 1/2010 | Overberg et al. |
| 2010/0003431 A1 | 1/2010 | Raybuck |
| 2011/0244214 A1 | 10/2011 | Steichen et al. |
| 2011/0293859 A1 | 12/2011 | Fu et al. |

FOREIGN PATENT DOCUMENTS

| | | |
|---|---|---|
| EP | 0763421 | 3/1997 |
| EP | 0962817 | 12/1999 |
| EP | 1582522 | 10/2005 |
| EP | 1483116 | 1/2006 |
| JP | H02188295 | 7/1990 |
| WO | WO-9928050 | 6/1999 |
| WO | WO-9961521 | 12/1999 |
| WO | WO-2010071632 | 6/2010 |
| WO | WO-2012141977 | 10/2012 |

OTHER PUBLICATIONS

European Search Report dated Jan. 20, 2015 for Application No./Patent No. 12874047.9-1701 PCT/US2012033594, Applicant Hewlett-Packard Development Company, L.P.

Excert from website, www.Getraenkekarton.de, "Verbunde sind Hightech-Werkstoffe" & EN google translation, printed on Mar. 27, 2017.

Gokhun, Yilmaz "Effects of titanate coupling agents on low density polyethelene and polypropylene blends and composites", Nov. 2008.

Kenrich Petrochemicals, Inc., S.J.Monte "Titanates and zirconates in thermoplastic and elastomer compounds", http://www.4kenrich.com/content/home-page/titanates-and-zirconates-in-thermoplastic-and-elastomer-compounds.html, no date provided.

Synthetic Papers based on Biaxially Oriented Fiims—published during 19. Leobener Kunststoff-Kolloquium, 16 & 17, Nov. 2006.

Wikipedia-Excerpt "Paper", printed on Mar. 20, 2017.

* cited by examiner

RECORDING MEDIA

BACKGROUND

Traditional photographic bases include a resin layer coated onto both the frontside and backside of a raw base paper to form a photobase substrate. An imaging layer is often also coated onto one or both side(s) of the photobase for imaging purposes. This coating can create an unbalanced stress in the final product, resulting in curl.

Curl control can be achieved using one or more of certain techniques. In some examples, curl can be addressed by increasing the basis weight of the raw base (more fiber increases the caliper/stiffness, thereby reducing the resulting curl of the coated product). Alternatively, curl can be alleviated by applying a coating to the backside to create a balancing stress on the backside that offsets the frontside coating (typically used for swellable media). Thus, providing additional solutions to the problem of curl control would be an advancement in the art.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
FIG. 1 is a cross-section perspective of a recording media in accordance with an example of the present disclosure.
Figure 2:
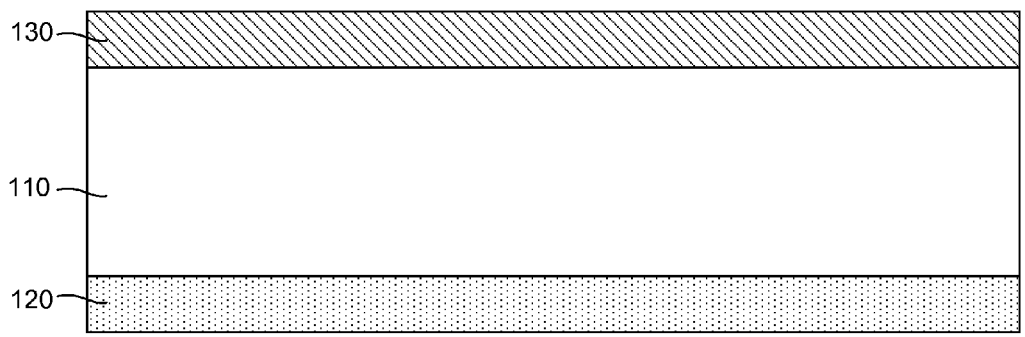
FIG. 2 is a cross-section perspective of a recording media in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

It has been recognized that surface activating filler materials used in extruded polyethylene layers can provide recording media with good performance and printing characteristics over a wide variety of applications. Notably, combining fillers with organic reagents can allow for increased filler loading, expansion of different types of fillers that can be used in polyethylene extruded layer, and increased stiffness and strength in the resulting recording media.

Without being bound by any particular theory, it is believed that combining the filler with the organic reagent activates the surface of the fillers with organic functional groups allowing the fillers to interact with the polyethylene and increasing the compatibility between filler and polyethylene. In accordance with this, compositions and associated methods described herein are directed towards a recording media having an extruded polyethylene layer on a side of a base paper. The extruded polyethylene layer has a filler and organic reagent incorporated therein. It is noted that when discussing the present compositions and methods, each of these discussions can be considered applicable to each of these embodiments, whether or not they are explicitly discussed in the context of that embodiment. Thus, for example, in discussing a filler used in a recording medium, such a filler can also be used in a method of coating a base paper, and vice versa.

Generally, recording media can have a variety of layers including extruded layers, curl control layers, barrier layers, imaging layers, etc., and such layers often use costly additives to provide acceptable media sheets for printing. However, it has been recognized incorporating fillers with organic reagents in the extruded polyethylene layers can eliminate the need for some layers, can eliminate costly additives, and/or can eliminate the amounts of materials needed in the recording media.

With the above in mind, a recording media for printing can comprise a base paper and a backside extruded polyethylene layer on a side of the base paper. The backside extruded polyethylene layer can include a filler and organic reagent admixed in the extruded polyethylene layer. Generally, the filler and the organic reagent can be present in the backside extruded polyethylene layer in an amount of 20% by weight to 50% by weight based on the total weight of the backside extruded polyethylene layer. In one example, a portion of the filler and the organic reagent combine to form surface activated filler admixed in the extruded polyethylene layer.

In one example, the recording media can further comprise a frontside extruded polyethylene layer on one side of the base paper. In one example, the frontside extruded polyethylene layer can comprise a filler and an organic reagent.

Additionally, such recording media can further include imaging layers and curl control layers. In one example, the recording media can further comprise an imaging layer coated on the frontside extruded polyethylene layer. Additionally, the recording media can further comprising an imaging layer coated on the backside extruded polyethylene layer. The recording media can further comprise imaging layers coated on both the frontside and backside extruded polyethylene layers. In one aspect, an imaging layer can be coated directly on the base paper. In another aspect, an imaging layer can be coated on intervening layer(s) between the base paper and the imaging layer. Such intervening layer(s) can include any layers described herein, or other coating layers used in conjunction with recording media; for example, moisture/barrier layers. In one example, the recording media can further comprise a curl control layer coated on the backside extruded polyethylene layer.

Generally, the backside extruded polyethylene layer is coated on the backside of the base paper in an amount ranging from 10 gsm to 45 gsm. In one aspect, the backside extruded polyethylene layer is coated on the backside of the base paper in an amount ranging from 15 gsm to 30 gsm. Other layers disclosed herein can also be coated in such amounts. To offset stresses in the recording media, in one example, the recording media can have a coating thickness ratio of backside extruded polyethylene layer to frontside extruded polyethylene layer ranging from 1.5:1 to 2:1. In other examples, the coating thickness ratio can be applied to the backside extruded polyethylene layer and other layers used on one or both side(s) of the base paper, including barrier layers, imaging layers, other coating layers, and combinations thereof. Additionally, the resulting layers on the backside of the base paper and the resulting layers on the frontside of the base paper can be modified or coated in amounts such that the total amounts can provide the coating thickness ratio.

The frontside extruded polyethylene layer and the backside extruded polyethylene layer can independently comprise a polyethylene selected from the group of low density polyethylene (LDPE), high density polyethylene (HDPE), and mixtures thereof.

Additionally, the filler of the frontside extruded polyethylene layer and/or the backside extruded polyethylene layer can be independently selected from the group of calcium carbonate, zeolite, silica, talc, alumina, aluminum trihydrate (ATH), calcium silicate, kaolin, calcined clay, and combinations thereof. As discussed herein, the filler and the treating agent can be present in the extruded polyethylene layer(s) in an amount of 20% by weight to 50% by weight based on the total weight of the extruded polyethylene layer. In one aspect, the filler and the organic reagent can be present in the extruded polyethylene layer(s) in an amount of 30% by weight to 45% by weight.

The organic reagent of the fronstside extruded polyethylene layer and/or the backside extruded polyethylene layer generally can be any organic reagent cable of surface modifying fillers as described herein. In one example, the organic reagent can be present in an amount of about 1% to 10% by weight based on the total weight of the filler and organic reagent. In another example, the organic reagent can comprise acids including stearic acid and acid esters, organosilanes, organometallics, and mixtures thereof.

As such, in one example, the organic reagent can be an organosilane reagent. In one aspect, the organosilane reagent can be an amine-containing silane selected from the group of 3-aminopropyltrimethoxysilane, 3-aminopropyltriethoxysilane, 3-aminoethylaminopropyltrimethoxysilane, 3-aminoethylaminopropyltriethoxysilane, 3-aminoethylaminoethylaminopropyltrimethoxysilane, 3-aminoethylaminoethylaminopropyltriethoxysilane, 3-aminopropylsilsesquioxane, (n-Butyl)-3-aminopropyltrimethoxysilane, (n-Butyl)-3-aminopropyltriethoxysilane, bis-(3-trimethoxysilylpropyl)amine, N-benzyl-N-aminoethyl-3-aminopropyltrimethoxysilane hydrochloride, N-phenyl-3-aminopropyltrimethoxysilane, N-(2-aminoethyl-3-aminopropyltrimethoxysilane, 3-(triethoxysilylpropyl)-diethylenetriamine, poly(ethyleneimine) trimethoxysilane, and combinations thereof.

In another example, the organic reagent can be a monoalkoxy titanate. The monoalkoxy titanates can be selected from KR® TTS Titanium IV 2-propanolato, tris isooctadecanoato-O; KR® 7 Titanium IV bis 2-methyl-2-propenoato-O, isooctadecanoato-O 2-propanolato; KR® 9SQ Titanium IV 2-propanolato, tris(dodecyl)benzenesulfanato-O; KR® 12 Titanium IV 2-propanolato, tris(dioctyl)phosphato-O; KR® 26S Titanium IV (4-amino)benzene sultonato-O, bis(dodecyl)benzene sulfonato-0,2-propanolato; KR® 33DS Titanium IV, tris(2-methyl)-2-propenoato-O, methoxydiglycolylato; KR® 38S Titanium IV 2-propanolato, tris(dioctyl) pyrophosphato-O; KR® 39DS Titanium IV, tris(2-propenoato-O), methoxydiglycolylato-O; and KR® 44 Titanium IV 2-propanolato, tris(3,6-diaza)hexanolat, all available from Kenrich Petrochemicals, Inc.

In further detail, the organic reagent can be an oxyacetate chelate titanate. In one aspect, the oxyacetate chelate titanate can be selected from KR® 134S Titanium IV bis[4-(2-phenyl)-2-propyl-2]phenolato, oxoethylenediolato; KR® 138S Titanium IV bis(dioctyl)pyrophosphato-O, oxoethylenediolato, (adduct), (dioctyl) (hydrogen)phosphite; KR® 133DS Titanium IV oxoethylenediolato, tris(2-methyl)-2-propenoato-O; KR® 158FS Titanium IV bis(butyl, methyl) pyrophosphato-0, oxoethylene-diolato, (adduct), bis(dioctyl)hydrogen phosphite; A,B Ethylene Chelate Titanates; KR® 212 Titanium IV bis(dioctyl)phosphato-O, ethylenediolato; KR® 238S Titanium IV bis(dioctyl)pyrophosphato-O, ethylenediolato (adduct), bis(dioctyl)hydrogen phosphite; KR® 262ES Titanium IV bis(butyl, methyl) pyrophosphato-O, ethylenediolato, (adduct), bis(dioctyl) hydrogen phosphite, all available from Kenrich Petrochemicals, Inc.

Additionally, the organic reagent can be a quat titanate and/or zirconate. In one aspect, the quat titanate and/or zirconate can be selected from the group of KR® 138D Titanium IV bis(dioctyl)pyrophosphato-O, oxoethylenediolato, (adduct) 2 moles of 2-N,N-dimethylamino-2-methylpropanol; KR® 158D Titanium IV bis(butyl methyl)pyrophosphato-O, (adduct) 2 moles 2-N,N-dimethylamino-2-methylpropanol; KR® 238S Titanium IV ethylenediolato, bis(dioctyl)pyrophosphato-O, bis(triethyl)amine salt; KR® 238M Titanium IV ethylenediolato bis(dioctyl)pyrophosphato-O, bis(dialkyl)amino alkyl-2-methyl propenoate; KR® 238A Titanium IV bis(dioctyl)pyrophosphato-O, ethylenediolato, (adduct) 2 moles of acrylato-O active amine; KR® 238J Titanium IV bis(dioctyl)pyrophosphato-O, ethylenediolato, (adduct) 2 moles of 2 methylpropenoamido N active amine; KR® 262A Titanium IV bis(butyl, methyl) pyrophosphato, ethylenediolato, bis(dialkyl)amino alkyl acrylate salt; LICA® 38J Titanium IV (bis-2-propenolatomethyl)-1-butanolato, bis(dioctyl) pyrophosphato-O, (adduct) 3 moles N,N-dimethylamino-alkyl propenoamide; NZ® 38J Zirconium IV 2. 2-dimethyl 1,3 propanediolato, bis(dioctyl)pyrophosphato-O, (adduct) 2 moles N,N-dimethylamino-alkyl propenoamide; and KZ™ TPPJ Zirconium IV (2-ethyl, 2-propenolatomethyl)1,3-propanediolato, cyclo bis 2-dimethylamino pyrophosphato-O, adduct with 2 moles of methanesulfonic acid, all available from Kenrich Petrochemicals, Inc.

Further, the organic reagent can be a coordinate titanate and/or zirconate. In one aspect, the coordinate titanate and/or zirconate can be selected from the group of KR® 41B Titanium IV tetrakis 2-propanolato, adduct 2 moles (dioctyl) hydrogen phosphate; KR® 46B Titanium IV tetrakis octanolato adduct 2 moles (di-tridecyl)hydrogen phosphite; KR® 55 Titanium IV tetrakis(bis 2-propenolato methyl)-1-butanolato adduct 2 moles (di-tridecyl)hydrogen phosphite; and KZ™ 55 Zirconium IV tetrakis 2,2(bis-2 propenolatomethyl)butanolato, adduct with 2 moles of di-tridecyl, hydrogen phosphite, all available from Kenrich Petrochemicals, Inc.

In another example, the organic reagent can be a neoalkoxy titanate. In one aspect, the neoalkoxy titanate can be selected from the group of LICA® 01 Titanium IV 2,2(bis 2-propenolatomethyl)butanolato, tris neodecanoato-O; LICA® 09 Titanium IV 2,2(bis 2-propenolatomethyl)butanolato, iris(dodecyl)benzenesulfonato-O; LICA® 12 Titanium IV 2,2(bis 2-propenolatomethyl)butanolato, tris(dioctyl)phosphato-O; LICA® 38 Titanium IV 2,2(bis 2-propenolatomethyl)butanolato, tris(dioctyl)pyrophosphato-O; LICA® 44 Titanium IV 2,2(bis 2-propenolatomethyl)butanolato, tris(2-ethylenediamino)ethylato; LICA® 97 Titanium IV 2,2(bis 2-propenolatomethyl)butanolato, tris (3-amino)phenylato; and LICA® 99 Titanium IV 2,2(bis 2-propenolatomethyl)butanolato, tris(6-hydroxy)hexanoato-O, all available from Kenrich Petrochemicals, Inc.

The organic reagent can alternatively be a cycloheteroatom titanate and/or zirconate. In one aspect, the cycloheteroatom titanate and/or zirconate can be selected from the group of KR® OPPR Titanium IV bis octanolato, cyclo (dioctyl)pyrophosphato-O, O; KR® OPP2 Titanium IV bis cyclo(dioctyl)pyrophosphato-O, O; KZ™ TPP Zirconium IV 2-ethyl, 2-propenolatomethyl 1,3-propanediolato, cyclo di 2,2-(bis 2-propenolatomethyl) butanolato pyrophosphato-O, O; and KZ™ OPPR Zirconium IV bis 2-ethylhexanolato, cyclo(di 2-ethylhexyl)pyrophosphate, all available from Kenrich Petrochemicals, Inc.

The organic reagent can also be a neoalkoxy zirconate. In one aspect, the neoalkoxy zirconate can be selected from the group of NZ® 01 Zirconium IV 2,2(bis-2-propenolatomethyl)butanolato, tris neodecanolato-O; NZ® 09 Zirconium IV 2,2(bis-2-propenolatomethyl)butanolato, tris(dodecyl) benzenesulfonato-O; NZ® 12 Zirconium IV 2,2(bis-2-propenolatomethyl)butanolato, tris(dioctyl)phosphato-O; NZ® 33 Zirconium IV 2,2(bis-2-propenolatomethyl)butanolato, tris 2-methyl-2-propenoato-0; NZ® 38 Zirconium IV 2,2 (bis-2-propenolatomethyl)butanolato, tris(dioctyl)pyrophosphato-O; NZ® 39 Zirconium IV 2,2(bis-2-propenolato)butanolato, tris 2-propenoato-O; NZ® 44 Zirconium IV 2,2 (bis-2-propenolatomethyl)butanolato, tris(2-ethylenediamino)ethylato; NZ® 37 Zirconium IV bis 2,2 (bis-2-propenolatomethyl)butanolato, bis(para amino benzoato-O); NZ® 66A Zirconium IV bis 2,2(bis-2-propenolatomethyl)butanolato, bis(3-mercapto)propionato-O; NZ® 97 Zirconium IV 1,1(bis-2-propenolatomethyl)butanolato, tris(2-amino)phenylato, all available from Kenrich Petrochemicals, Inc.

Still further, the organic reagent can be an aluminate. In one aspect, the aluminate can be selected from the group of KA™ 301 Di-isobutyl(oleyl)aceto acetyl aluminate; KA™ 322 Di-isopropyl(oleyl)aceto acetyl aluminate; and KA™ 489 a mixture of di-ester phosphato aluminum chelates, all available from Kenrich Petrochemicals, Inc.

The present recording media can be used in conjunction with printing inks. The recording media can be applied in multiple imaging systems, non-limiting examples of which include thermal or piezo inkjet, dye-sub, thermal transfer, electrostatic, liquid electrophotographic printing (LEP), etc. In one aspect, the recording media can be used with ink-jet inks comprising pigments and/or dyes in an ink vehicle. Typical ink vehicle formulations can include water, and can further include co-solvents present in total at from 0.1 wt % to 30 wt %, depending on the jetting architecture, though amounts outside of this range can also be used. Further, non-ionic, cationic, and/or anionic surfactants can be present, ranging from 0.01 wt % to 10 wt %. In addition to the colorant, the balance of the formulation can be purified water, or other vehicle components known in the art, such as biocides, viscosity modifiers, materials for pH adjustment, sequestering agents, preservatives, and the like.

Figure 3:
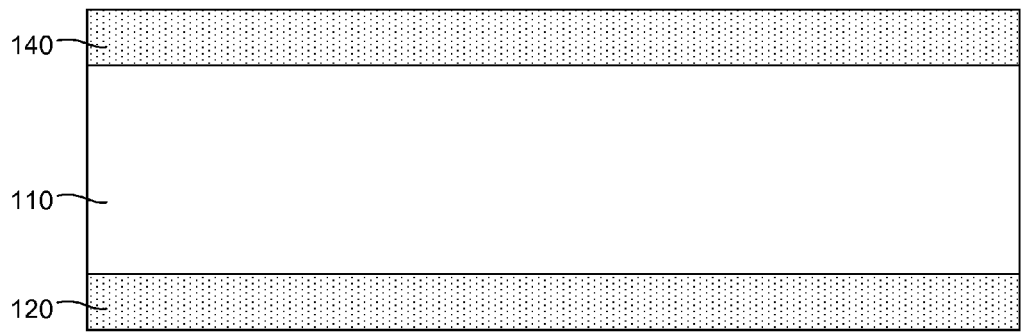
FIG. 3 is a cross-section perspective of a recording media in accordance with an example of the present disclosure.
Figure 4:
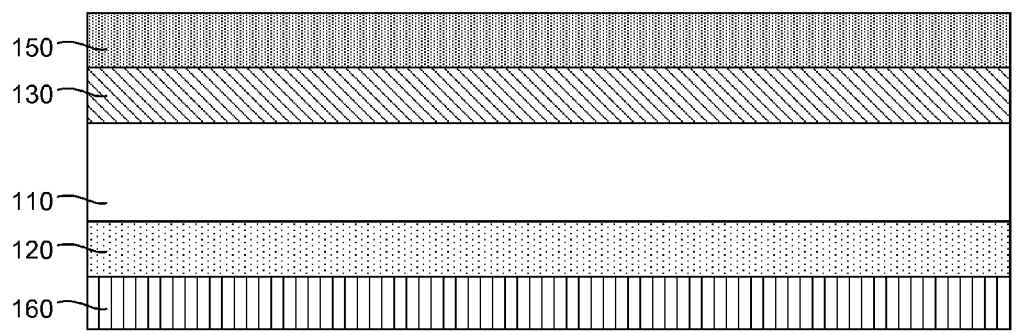
FIG. 4 is a cross-section perspective of a recording media in accordance with an example of the present disclosure.
Figure 5:
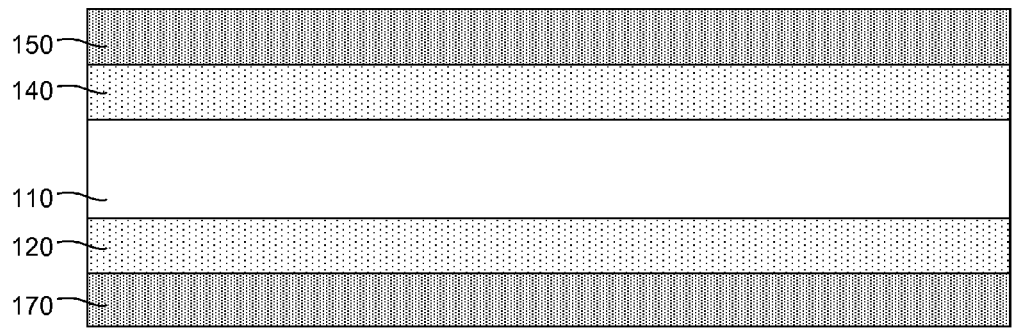
FIG. 5 is a cross-section perspective of a recording media in accordance with an example of the present disclosure.

Turning now to FIGS. 1-5, a recording media can include a base paper 110 and a backside extruded polyethylene layer 120 having a filler and organic reagent admixed therein (FIG. 1). The recording media can further comprise a frontside extruded polyethylene layer 130 (FIG. 2) or a frontside extruded polyethylene layer 140 having a filler and organic reagent admixed therein (FIG. 3). Alternatively, the recording media can include additional imaging layers 150 and 170 and/or curl control layers 160 as shown in FIGS. 4-5. While the present recording media has been illustrated in FIGS. 1-5, such examples are not limiting as other configurations are contemplated herein.

In addition to the recording media described herein, the present disclosure provides for methods relating thereto. Generally, a method of coating a base paper can comprise extruding polyethylene onto a side of the base paper forming a backside extruded polyethylene layer. As discussed herein, the backside extruded polyethylene layer generally includes a filler and an organic reagent admixed in the extruded polyethylene layer, where the filler and organic reagent are present in the backside extruded polyethylene layer in an amount of 20% by weight to 50% by weight based on the total weight of the backside extruded polyethylene layer. In one example, the filler and the organic reagent can be admixed in the polyethylene during the extruding. In another example, the filler and organic reagent can be admixed in the polyethylene before the extruding. Additionally, the filler and organic reagent can be previously combined before admixing in the polyethylene before or during extruding. Further, the method can also comprise extruding polyethylene onto one side of the base paper forming a frontside extruded polyethylene layer. As discussed herein, the frontside extruded polyethylene layer can include a filler and organic reagent admixed therein, where the filler and organic reagent are present in the frontside extruded polyethylene layer in an amount of 20% by weight to 50% by weight based on the total weight of the frontside extruded polyethylene layer.

Regarding the present method steps, such steps can be performed in a number of sequences and are not intended to be limited to the order written. For example, the frontside extruded polyethylene layer can be extruded before the backside extruded polyethylene layer, and vice versa. Additionally, it is noted that any and all combinations of such steps or individual step may be performed sequentially or simultaneously. For example, extruding the backside polyethylene layer and extruding the frontside polyethylene layer may be performed sequentially or may be performed simultaneously.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, "organic reagent" refers to any organic compound capable of modifying a filler and which allows the filler to interact with polyethylene, thereby increasing the compatibility between the filler and the polyethylene. In one example, the organic reagent and filler can combine to form a surface-activated filler. In another aspect, the organic reagent can covalently bond to the surface of the filler, thereby activating the outer surface of the filler.

As used herein, "stiffness" refers to bending stiffness as opposed to elastic modulus. Elastic modulus is an intensive property of the material. Bending stiffness is an extensive property of the composite body. Bending stiffness is dependent on both material (i.e. Elastic Modulus) and shape and boundary conditions of the solid body. As used in the Examples, the shape and boundary conditions were held as constant as was physically possible for the experimental design. As a result, an increase in elastic modulus in the materials gave a photobase of an imagable article with a higher bending stiffness and rigidity at a given thickness (e.g., product construction).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following examples illustrate some embodiments of the present recording media and methods that are presently known. However, it is to be understood that the following are only exemplary or illustrative of the application of the principles of the present recording media and methods. Numerous modifications and alternative examples may be devised by those skilled in the art without departing from the spirit and scope of the present compositions and methods. The appended claims are intended to cover such modifications and arrangements. Thus, while the present recording media and methods have been described above with particularity, the following examples provide further detail in connection with what are presently deemed to be the acceptable embodiments.

Example 1—Recording Media with Extruded Layers

The present recording media were generally prepared by admixing a surface treated filler (treated calcium carbonate, Polycal™ EC from Heritage Plastics Inc.) with low density polyethylene (LDPE) in a master batch. The master batch was then added to a LDPE and extruded on to the frontside and backside of a base paper, 170 gsm photobase, in coating weights of 25 gsm. The amounts of components in the master batch and frontside extruded layer are listed in Table 1. The amounts of components in the master batch and backside extruded layer are listed in Table 2.

TABLE 1

| Recording Media | Master Batch | | Frontside Extruded Layer | |
|---|---|---|---|---|
| | LDPE (wt %) | Surface Treated Filler (wt %) | Surface Treated Filler (wt %) | LDPE (wt %) |
| #1 | 100 | 0 | 0 | 100 |
| #2 | 85.7 | 14.3 | 10 | 90 |
| #3 | 71.4 | 28.6 | 20 | 80 |
| #4 | 57.1 | 42.9 | 30 | 70 |
| #5 | 42.9 | 57.1 | 40 | 60 |
| #6 | 28.6 | 71.4 | 50 | 40 |
| #7 | 100 | 0 | 0 | 100 |

TABLE 2

| Recording Media | Master Batch | | Backside Extruded Layer | |
|---|---|---|---|---|
| | LDPE (wt %) | Surface Treated Filler (wt %) | Surface Treated Filler (wt %) | LDPE (wt %) |
| #1 | 100 | 0 | 0 | 100 |
| #2 | 85.7 | 14.3 | 10 | 90 |
| #3 | 71.4 | 28.6 | 20 | 80 |
| #4 | 57.1 | 42.9 | 30 | 70 |
| #5 | 42.9 | 57.1 | 40 | 60 |
| #6 | 28.6 | 71.4 | 50 | 50 |
| #7 | 42.9 | 57.1 | 40 | 60 |

The present media, #1-7, all provided acceptable coatings for printing when applied with imaging layers. Notably, recording media #6 contained the highest amount of filler and started to show some film uniformity discrepancies, and as such, media having higher amounts of filler than 50 wt % would not be expected to be usable in this specific embodiment. Notably, the extruded layers of #4-7 included significant amount of surface treated filler, at least 30 wt % and up to 50 wt %, in the final extruded coating(s). The amount of filler significantly reduces the amount of LDPE needed, and thereby significantly reduces the overall cost of the recording media. Additionally, the surface treated filler provides for increased stiffness of the recording media.

Example 2—Comparable Recording Media

The Recording Media #3-7 of Example 1 were constructed with untreated filler, calcium carbonate. However, the master batches could not be processed as the filler would not incorporate into a homogenous mixture. As such, the coatings could not be manufactured.

Example 3—Recording Media with Imaging Layer

The recording media #7 of Example 1 is further treated by coating an image layer on the LDPE on frontside of the base paper. The recording media is suitable for printing.

Example 4—Recording Media with Curl Control Layer

The recording media #6 of Example 1 is further treated by coating a curl control layer on the extruded layer on backside of the base paper. The recording media is suitable for printing. Additionally, the media can be further modified with an imaging layer on the frontside for printing with aqueous inks.

Example 5—Biased Recording Media

The recording media #7 of Example 1 is manufactured with 15 gsm of LDPE on the frontside of the base paper while maintaining the 25 gsm of the extruded layer on the backside of the base paper. The biased recording media provides curl control during printing.

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A recording media for printing, comprising:
  a base paper; and
  a backside extruded polyethylene layer on a side of the base paper, the backside extruded polyethylene layer including a filler and an organic reagent admixed in the extruded polyethylene layer, wherein the filler and organic reagent are present in the backside extruded polyethylene layer in an amount of 20% by weight to 50% by weight based on the total weight of the backside extruded polyethylene layer,
  wherein the organic reagent of the backside extruded polyethylene layer is selected from the group consisting of an organosilane reagent, monoalkoxy titanate, oxyacetate chelate titanate, quat titanate, quat zirconate, coordinate titanate, coordinate zirconate, neoalkoxy titanate, cycloheteroatom titanate, cycloheteroatom zirconate, neoalkoxy zirconate, and mixtures thereof.

2. The recording media of claim 1, wherein a portion of filler and the organic reagent combine to form surface activated filler admixed in the backside extruded polyethylene layer.

3. The recording media of claim 1, further comprising a frontside extruded polyethylene layer on a side of the base paper.

4. The recording media of claim 3, wherein the frontside extruded polyethylene layer comprises a filler and an organic reagent admixed in the frontside extruded polyethylene layer, wherein a portion of filler and the organic reagent combine to form surface activated filler admixed in the frontside extruded polyethylene layer.

5. The recording media of claim 4, further comprising an imaging layer coated on the frontside extruded polyethylene layer.

6. The recording media of claim 5, further comprising an imaging layer coated on the backside extruded polyethylene layer.

7. The recording media of claim 3, further comprising an imaging layer coated on the frontside extruded polyethylene layer.

8. The recording media of claim 3, further comprising a curl control layer coated on the backside extruded polyethylene layer.

9. The recording media of claim 3, wherein the backside extruded polyethylene layer is coated on a side of the base paper in an amount ranging from 10 gsm to 45 gsm and having a coating thickness ratio of backside extruded polyethylene layer to frontside extruded polyethylene layer ranging from 1.5:1 to 2:1.

10. The recording media of claim 3, wherein the frontside extruded polyethylene layer and the backside extruded polyethylene layer independently comprise a polyethylene selected from the group of LDPE, HDPE, and mixtures thereof; and wherein the filler of the backside extruded polyethylene layer is selected from the group of calcium carbonate, zeolite, silica, talc, alumina, aluminum trihydrate (ATH), calcium silicate, kaolin, calcined clay, and combinations thereof.

11. The recording media of claim 3, wherein the organic reagent is present in an amount of about 1% to 10% by weight based on the total weight of the filler and the organic reagent.

12. A method of coating a base paper, comprising
   extruding polyethylene onto a side of the base paper forming a backside extruded polyethylene layer, wherein the backside extruded polyethylene layer includes a filler and an organic reagent admixed in the extruded polyethylene layer, wherein the filler and organic reagent are present in the backside extruded polyethylene layer in an amount of 20% by weight to 50% by weight based on the total weight of the backside extruded polyethylene layer,
   wherein the organic reagent of the backside extruded polyethylene layer is selected from the group consisting of an organosilane reagent, monoalkoxy titanate, oxyacetate chelate titanate, quat titanate, quat zirconate, coordinate titanate, coordinate zirconate, neoalkoxy titanate, cycloheteroatom titanate, cycloheteroatom zirconate, neoalkoxy zirconate, and mixtures thereof.

13. The method of claim 12, wherein the filler and organic reagent is admixed in the polyethylene during the extruding.

14. The method of claim 12, wherein the filler and organic reagent is admixed in the polyethylene before the extruding.

15. The method of claim 12, further comprising extruding polyethylene onto an opposite side of the base paper forming a frontside extruded polyethylene layer, wherein the frontside extruded polyethylene layer includes a filler and an organic reagent admixed in the frontside extruded polyethylene layer, wherein the filler and the organic reagent are present in the frontside extruded polyethylene layer in an amount of 20% by weight to 50% by weight based on the total weight of the frontside extruded polyethylene layer.

* * * * *